(No Model.)

G. H. REYNOLDS.
BARREL FOR PNEUMATIC GUNS.

No. 421,314. Patented Feb. 11, 1890.

Witnesses
Henry Eichbaum
Frank Bowne Jones

George H. Reynolds
by his attorney
Thomas Drew Stetson

UNITED STATES PATENT OFFICE.

GEORGE H. REYNOLDS, OF NEW YORK, N. Y.

BARREL FOR PNEUMATIC GUNS.

SPECIFICATION forming part of Letters Patent No. 421,314, dated February 11, 1890.

Application filed March 6, 1889. Renewed January 10, 1890. Serial No. 336,493. (No model.)

*To all whom it may concern:*

Be it known that I, GEORGE H. REYNOLDS, of the city and county of New York, in the State of New York, have invented a certain new and useful Improvement in Gun-Barrels, of which the following is a specification.

My invention is intended mainly or entirely for barrels or directing-tubes for apparatus for discharging projectiles by the force of compressed air or gas. I will term the apparatus a "gun," and this portion of the apparatus a "gun-barrel," although it may be much thinner and lighter than barrels used for powder-guns, and may be differently mounted, elevated, and trained.

I have discovered that a peculiarly light, strong, and efficient gun-barrel for compressed air may be constructed mainly of metallic ribbons wound spirally in several layers and united by solder. The ends require to be peculiarly fortified. The outer and inner surfaces are best made of brass or other incorrodible material. The middle layers should be of steel. Each end is received within a ring of metal which is capable of being tinned, as wrought-iron or steel, so as to be strongly united by solder. The end pieces are coated with tin, and are also provided in their interiors with annular recesses, which latter are filled with solder. In applying the parts together the main body, composed of spiral ribbons, previously well laid together and soldered, is fitted tightly into the interior of one of the end pieces, and the latter is heated by gas-burners or otherwise, while the interior of the main body is kept cool. Under these conditions the temperature of the end piece is raised until the solder in the recesses is fused. The structure is held with its axis vertical, and the solder from each of the recesses flows down into the joint below, insuring a perfect union over the whole surfaces except the small recesses. (Any deficiency in the amount of solder in these recesses is made up by adding solder in the recesses at the upper end.) If these recesses become partly emptied, no mischief results. The solder should close the joint where each end of the body abuts against an offset in the corresponding end piece.

The following is a description of what I consider the best means of carrying out the invention.

The accompanying drawings form a part of this specification.

Figure 1:
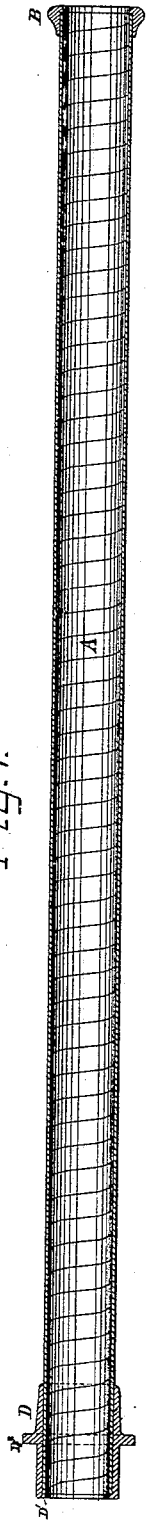
Figure 3:
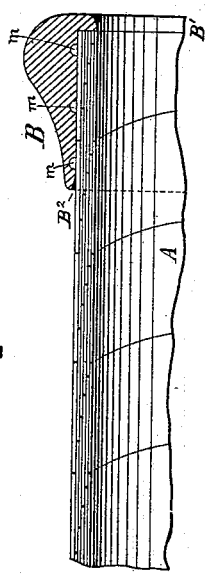
Figure 2:
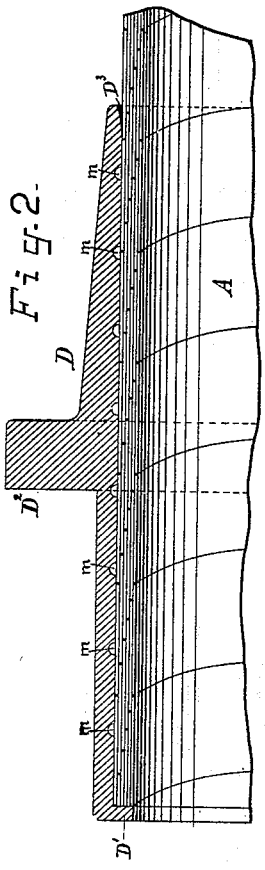
Figure 4:
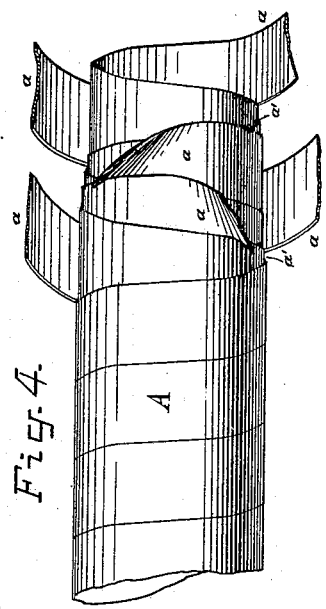

Figure 1 is a central longitudinal section through the entire directing tube or barrel, excepting always the provisions for closing the breech, which latter may be of any ordinary or suitable character. The remaining figures show portions on a larger scale. Figs. 2 and 3 are central longitudinal sections. Fig. 4 is a perspective view illustrating the construction of the main body.

Similar letters of reference indicate corresponding parts in all the figures where they occur.

A is the main body, composed of thin metallic strips or ribbons *a*, applied in layers, each wound spirally, with the edge of each abutting against the edge of the next. Joints in the several layers are distributed so as to give as nearly uniform strength as possible. The joints between each coil and the next, and the entire surfaces between each layer and the next, are united with solder $a'$.

B is an end piece applied at the muzzle. It is formed with an internal lip B', which abuts against the smoothly-cut and tinned end of the main body A. Grooves *m* are formed in the interior of the ring B, each extending quite around. These grooves are filled with solder, and the whole inner face of the ring B and of the lip B' are coated with tin or with solder.

D is an end piece applied at the rear end and adapted to be joined to an extension, (not represented,) which may be formed in the same manner, and also to receive a trunnion-ring. (Not represented.) This piece D, like the piece B, is made of metal, which will receive and hold a coating of tin. It is formed with an internal lip D', which abuts against the rear end of the body A, and is tinned on its entire interior. A series of grooves *m* are formed in the interior of this piece D. Each is filled with solder in the same manner as the grooves similarly lettered in the front piece B. A stout flange $D^2$ on the exterior of the ring D aids to hold the ring, and also the strongly-attached body A, by matching against the edge of a trunnion-ring, (not shown,) but which performs the usual functions of allowing the barrel to be held at various angles, technically "elevated," as required.

The solder which is applied in the grooves $m$ should be compounded so as to fuse at a little lower temperature than the harder solder, which holds together the several layers of ribbons and the several coils of each layer in the body A.

In applying the parts together the body A is inserted in the end piece B, and being held with its axis vertical a series of gas-flames is applied on the exterior of the ring, while a draft of cold air, or, if necessary, a spray of water, is applied in the inside of the body. When the ring B and the exterior layer of the body A are sufficiently heated, the solder in the grooves $m$ will melt and diffuse itself through the joint between B and A. Additional solder may be applied, if judged expedient, to flow down into the joint from the upper edge of the ring B at the channel $B^2$, provided for that purpose while thus held. The solder joins all the surfaces, including the joint between the lip B' and the end of the body A. If a little solder exudes on the inner face of the gun, it must be carefully removed when the parts are cold. The same general process is applied in the joining of the ring D to the rear end of the main body. This part is longer, and it is for that reason still less practicable to apply sufficient solder from the upper edge alone. The several grooves $m$ each supply the solder necessary for a close joint below. Solder is also applied at the upper edge at the channel $D^3$. When all is joined, including the joint between the abutting lip D' and the rear end of the body A, this is allowed to cool, and any solder exuding on the inner face is removed.

Modifications may be made without departing from the principle or sacrificing the advantages of the invention. There may be a greater or a less number of the annular grooves $m$. The edges of the several coils of the ribbons $a$ may be beveled instead of abutting squarely together. I can dispense with the flange $D^2$; and employ other means for holding and directing the barrel.

I claim as my invention—

1. A gun-barrel having a body A, formed of spiral ribbons $a$ in several layers united by solder, in combination with the end pieces B and D, with their respective lips B' and D' abutting against the corresponding ends of the body and joined by solder, as herein specified.

2. The gun-barrel or directing-tube described, having a body A, of spiral metallic ribbons $a$ in several layers, the outermost and innermost of non-corrodible material, in combination with end pieces B B' and D D', each provided with internal annular grooves $m$, containing solder applied together, substantially as herein specified.

3. A gun-barrel composed of thin ribbons of sheet metal, the outer layers being non-corrosive, and the whole united with a solder, as herein specified.

In testimony whereof I have hereunto set my hand, at New York city, New York, this 4th day of March, 1889, in the presence of two subscribing witnesses.

GEO. H. REYNOLDS.

Witnesses:
CHARLES R. SEARLE,
CHAS F. BARTER.